United States Patent [19]
Eberhardt

[11] 3,814,979
[45] June 4, 1974

[54] SMOOTHING OPTICAL CATHODE RAY TUBE

[75] Inventor: Edward H. Eberhardt, Fort Wayne, Ind.

[73] Assignee: International Telephone and Telegraph Corporation, Nutley, N.J.

[22] Filed: Sept. 29, 1972

[21] Appl. No.: 293,683

[52] U.S. Cl.................. 315/11, 315/12, 313/65 R
[51] Int. Cl. ............................................ H01j 31/48
[58] Field of Search ........ 315/11, 12; 313/65 R, 93; 250/213 VT, 332

[56] References Cited
UNITED STATES PATENTS

| | | | |
|---|---|---|---|
| 3,295,010 | 12/1966 | Clayton | 315/12 X |
| 3,437,752 | 4/1969 | Ford | 315/12 X |
| 3,555,344 | 1/1971 | Moore | 315/11 |
| 3,612,762 | 10/1971 | Wuellner et al. | 315/11 X |
| 3,700,953 | 10/1972 | Suzuki et al. | 315/11 |

OTHER PUBLICATIONS

McNall et al., The Response of Phosphor-Output Image Intensifiers to Single-Photon Inputs, Pub. Astro. Soc. of Pacific, Vol. 82, No. 488, August, 1970.
Eberhardt et al., Method of Improving the SNR of an Image Dissector for Use in an Electronic Scanning Spectrometer, Applied Optics, Vol. 10, No. 8, August 1971.
Bradley et al., Picosecond Electron-Optical Chronography, Appl. Phys. Lett., Vol. 20, No. 6, March 15, 1972.
Butslov et al., Multistage Image Converter Tubes For Studying High-Speed Phenomena, Optical Technology, Vol. 39, No. 8, August, 1972.

*Primary Examiner*—Leland A. Sebastian
*Assistant Examiner*—P. A. Nelson
*Attorney, Agent, or Firm*—Menotti J. Lombardi, Jr.; Edward Goldberg

[57] ABSTRACT

An image dissector is combined with an optical cathode ray tube to provide detection and observation of very short duration low level pulses of light. The cathode ray tube includes a photocathode, accelerating grid, fast sweep deflection electrodes and focusing coils to direct electrons onto a slow decay phosphor screen. This is optically coupled to the image dissector having another photocathode, low frequency sweep deflection coils, focusing coils and a scanning aperture which directs electrons into a multiplier for connection to a display or utilization device. The phosphor screen provides temporary storage of short duration light pulses while the slow scan dissector provides discrete output signal pulses of amplitudes proportional to brightness. The device has a sensitivity capable of detecting single photons with a time resolution in the order of picoseconds.

7 Claims, 2 Drawing Figures

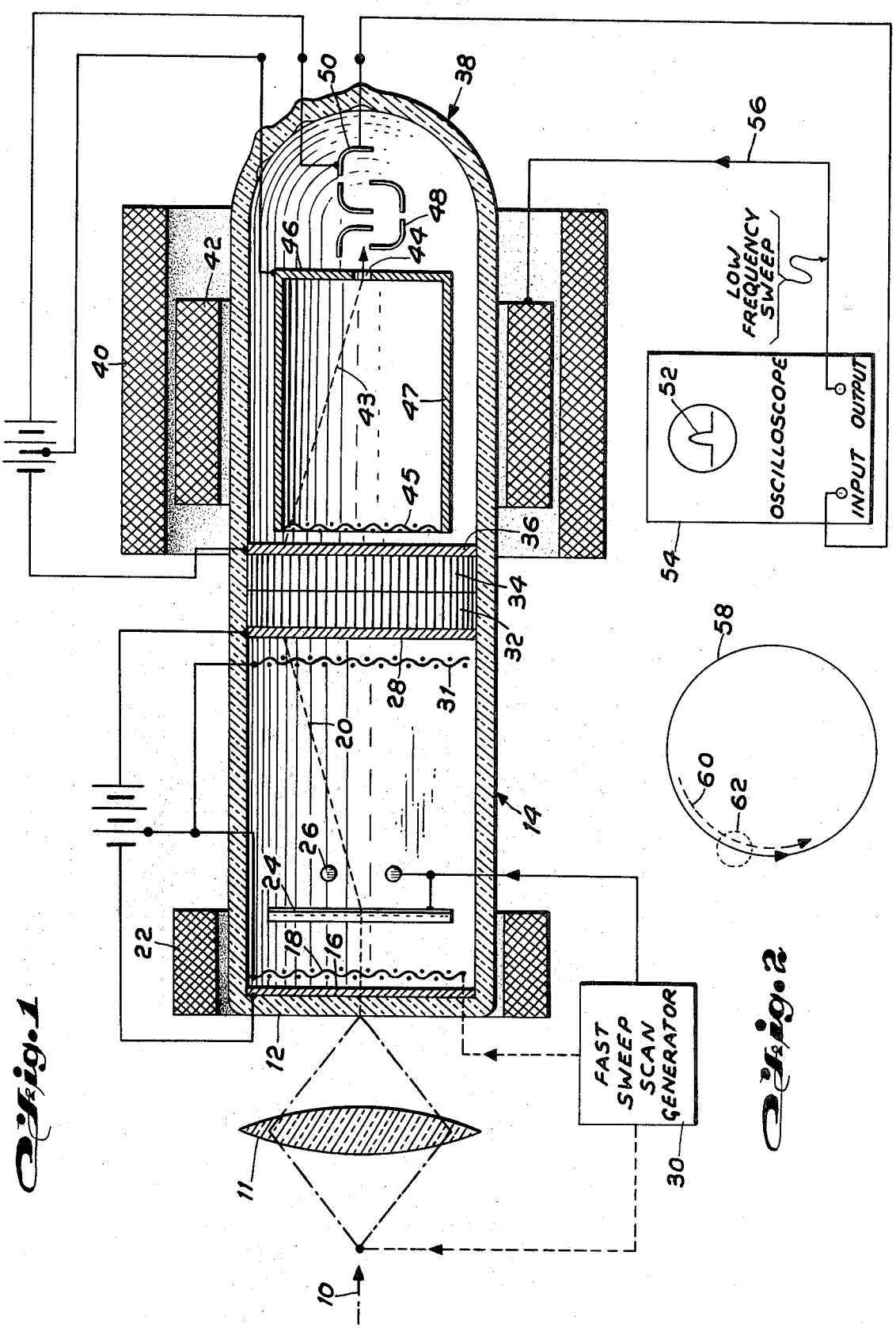

SMOOTHING OPTICAL CATHODE RAY TUBE

BACKGROUND OF THE INVENTION

1. Field of the Invention

This invention relates to image tubes for detecting short duration light pulses and particularly to an improved scanning image tube of increased sensitivity and timing resolution.

2. Description of the Prior Art

Previous devices for detecting and displaying light pulses of very short duration, such as laser pulses, have included high speed photographic techniques, broad band traveling wave cathode ray tube combinations and sampling oscilloscopes which operate in the 10 to 100 picosecond range. A more recent development is described in U.S. Pat. No. 3,355,616, issued Nov. 28, 1967, wherein an image intensifier is combined with a smoothing image dissector to utilize the storage capability of a slow decay phosphor screen. The light input is intensified and directed onto the phosphor screen with the image dissector scanning the screen to provide a corresponding amplified output electrical signal. None of these devices however have been capable of observing single low level optical radiation pulses in the order of picosecond time resolution.

SUMMARY OF THE INVENTION

It is therefore the primary object of the present invention to provide an improved scanning image tube which can detect individual pulses of light and convert the light into electrical signals having a time resolution of picoseconds for display and measurement purposes.

This is achieved by a novel arrangement including an optical cathode ray tube having a photocathode at one end which emits electrons in response to light radiation, an adjacent accelerating mesh grid, intermediate fast sweep narrow band deflection electrodes and focusing coils which direct an electron beam onto a phosphor screen at the other end. The phosphor screen provides a light output corresponding to input light flux and temporary storage of the brightness information. The screen is optically coupled to another photocathode of an image dissector tube which has slow sweep deflection coils scanning the same relative areas as the cathode ray tube at a speed faster than the phosphor decay time. The electrons from the dissector photocathode are focused onto a scanning aperture of an electron multiplier which provides discrete output pulses of amplitudes proportional to brightness having picosecond time resolution for display and utilization devices. These and other objects and advantages will become more apparent from the following description taken in conjunction with the accompanying drawings.

BRIEF DESCRIPTION OF THE DRAWINGS

FIG. 1 is a schematic diagram showing the novel optical cathode ray tube and image dissector combination connected to a display device, and FIG. 2 illustrates the overlapping rotary sweep patterns of the cathode ray and dissector tubes.

DESCRIPTION OF THE PREFERRED EMBODIMENT

As shown in FIG. 1, a remote source of pulsed light 10 is directed and focused through a lens 11 onto the input faceplate 12 of optical cathode ray tube 14. A photocathode coating 16 on the inner surface of the faceplate emits electrons in accordance with the intensity of the light input or photons from the source. The electrons are accelerated by a closely spaced high voltage gradient pre-accelerator grid mesh 18 and focused into a beam 20 by short magnetic focusing coils 22. The accelerating voltage, approaching field emission breakdown, permits transfer of the electrons over relatively large distances with minimal time dispersion caused by spread in emission energies. Typical voltage requirements would be in the order of $10^4$ to $10^5$ volts/cm, or for example, 1,000 volts for a 1 mm spacing between cathode 16 and grid 18.

The beam 20 passes through pairs of horizontal and vertical electrostatic deflection electrodes 24, 26, such as high frequency resonant Lecher rods, which provide an impulse deflection for rapidly scanning the beam over a phosphor screen 28. The impulse deflection tends to deflect all electrons equally regardless of time dispersion. The deflection rods can be driven by a fast sweep scan generator 30 supplying a high voltage narrow band sinusoidally resonant sweep voltage with the phase shifted 90° between the two pairs to provide a circular deflection. A high varying voltage gradient of a peak value approaching breakdown of from $10^4$ to $10^5$ volts/cm should be applied to the deflection electrodes. With sufficient damping, a spiral sweep can be applied which has a longer sweep path before repetition. The deflection is not driven by a signal voltage of variable amplitudes as in conventional cathode ray tubes and therefore can be resonated and the high voltage beam deflected without excessive driving power. Use of a circular deflection at a constant deflection angle also tends to minimize deflection focusing problems.

The direct photocathode input to the CRT thus allows direct detection of optical input flux. This bypasses the usual separate optical detector, with its conversion to a flow of current, the transfer of that current to a subsequent CRT deflection amplifier, and the application of the output to the deflection electrode of a CRT.

Synchronization of the high frequency scan with the light input pulses may be made automatic if the pulses are triggered from the scan generator 30. Electronic blanking, synchronized to the scan generator, can also be applied to the pre-accelerator grid 18 of the optical CRT to prevent undesired sweep overlap. For free running pulses, marker pips on the fast sweep, produced by a secondary calibrating fast light source may be used to achieve picosecond timing information.

Pulse time resolutions substantially less than 1 nanosecond ($10^{-9}$ sec.) and close to 1 picosecond ($10^{-12}$ sec.) can be achieved by this technique. Pulse time resolution may be defined as the ability to see two separate spots on the phosphor screen, for two short optical input pulses, separated by the stated time interval. A time separation between optical pulses is therefore converted by this device into a spatial separation between excited areas on the phosphor screen.

Circular sweeps resonated at 1 GHZ rates ($10^{-9}$ sec/sweep) may be utilized. Assuming that the electron spot size is of the order of 25 – 100 microns, this requires only 25 – 100 mm of sweep length, or phosphor screens of only 8 to 30 mm in diameter. Such sizes are conveniently compatible with present image tubes and image dissectors. Assuming that the spot size does not elongate with fast sweep beyond the above quiescent value, the above scan geometry would give $10^{-12}$ sec. or 1 picosecond time resolution for a single circular sweep. With spiral sweep the total sensitive time may be extended from $10^{-9}$ seconds (1 GHZ drive) to about $10^{-8}$ or $10^{-7}$ seconds at this same drive frequency and same time resolution.

In order to achieve sufficient brightness on phosphor screen 28, it may also be desirable to utilize an additional post accelerating grid 31 adjacent the screen end to further accelerate beam 20. A high direct voltage of from 10 to 15 Kv should be applied between the phosphor screen and cathode, with the cathode normally at ground or zero potential, grids 18 and 31 at about 1 – 2 Kv and the screen at the highest voltage.

The CRT phosphor screen 28 is excited by the accelerated electrons and emits light linearly, with the brightness of the spot of light being modulated by the intensity of the electron beam in accordance with the input light flux. The screen introduces a time delay of from $10^{-7}$ to $10^{-2}$ seconds for common phosphor materials which provides an inherent storage capability. Resultant photons from the light spot are parceled out over the phosphor decay time. The light is then coupled through output and input fiberoptic plates 32, 34 to the photocathode 36 of an image dissector tube 38 which operates in a "smoothing" mode. The dissector structure may be of the general type described in U.S. Pat. No. 3,295,010, issued Dec. 27, 1966 and assigned to the same assignee as the instant application. However, the mode of operation is modified to suit the present invention.

The image dissector includes magnetic focusing coils 40 and deflection coils 42 which focus and scan the resultant electron beam 43 across a scanning aperture 44 in plate 46. The beam also passes through an accelerating mesh 45 and drift tube 47 which may be at the same potential as plate 46. The deflection coils 42 preferably apply a circular or spiral sweep to the beam from photocathode 36 to scan aperture 44 at a relatively slow scan rate, in the order of $10^{-3}$ seconds, but at a faster rate than the phosphor decay time. The low frequency dissector scan path follows and overlaps the same rapid scan path of the cathode ray tube 14 to sense the brightness of light pulses stored on the phosphor screen 28. The electrons from the dissector photocathode are modulated in accordance with the light intensity and passed through scanning aperture 44 into an electron multiplier section 48. The electron multiplier provides an output signal at output electrode 50 having an amplitude which varies with the brightness of input light flux. The output pulse can then be displayed as a pulse 52 on oscilloscope 54 for measurement purposes or applied to other utilization devices. The osilloscope may also act as the source 56 of low frequency sinusoidal sweep current to drive the dissector deflection coils 42. This provides automatic synchronization and variable sweep rates. Suitable direct potentials on the dissector electrodes may include about 600 V between the photocathode and first multiplier dynode or aperture plate and about 1,400 V across the multiplier to the output electrode.

As shown in FIG. 2, the solid circular line 58 represents the fast rotary sweep provided by deflection electrodes 24, 26 of the optical cathode ray tube 14 to scan beam 20 across phosphor screen 28, while dashed line 60 and small dashed circle 62 represent the slow scanning of aperture 44 with respect to the dissector beam 43 over the same path in the dissector as the CRT fast scan. Due to the time dispersion introduced by the phosphor, the dissector has time to scan each excited spot on the phosphor and measure the phosphor brightness before the luminescence disappears. The dissector then acts as a scan converter, converting the sweep rates in the optical CRT down to values in the order of $10^0$ to $10^7$ cm/sec which can be handled by conventional oscilloscopes, and at the same time converting the brightness information on the phosphor screen to an electrical amplitude signal for "y" deflection of the monitoring oscilloscope. This conversion of "z" modulation on the optical CRT to "y" modulation on the monitoring conventional oscilloscope is an important advantage of the smoothing dissector readout, allowing the experimentalist to "see" picosecond pulse shape and pulse timing exactly as is done in the microsecond response region.

Another advantage of the smoothing dissector readout is the ability to extend the sensitivity of the device down to single photo-event performance. In this case use is made of the inherent ability of the dissector to detect single photoelectrons from its photocathode resulting from single photons at the CRT screen, and single primary photo-electrons from the CRT photocathode. The remaining number of photons emitted by the phosphor screen per electron input, of the order of $10^3$ to $10^4$ photons/electron, are redundant and can be lost to the dissector without loss of single input event information. Thus, the combination of a relatively slow scan image dissector scanning over the same path as the ultra-fast sweep of the optical CRT and converting the detected brightness information to a y-deflection signal, provides a display which combines single photon sensitivity with picosecond resolving power.

A conventional image dissector can read out a circular sweep quite easily in $10^{-5}$ sec (100 KHZ sweep), while retaining $10^{-8}$ sec. timing information (1,000 element resolution). With modifications, dissectors can be made to have as fast as $10^{-7}$ sec/sweep (10 MHZ drive) and up to $10^{-9}$ sec. timing, or only 100 elements/sweep. Thus, fast repetition rates are available for the readout process. This minimizes the dead time between the fast sweeps on the CRT. As a result a 1 nanosecond circular sweep can be read out in $10^{-5}$ to $10^{-7}$ seconds and the device can be ready to repeat in the same time interval. This $10^{-5}$ to $10^{-7}$ second repetition interval may be compared to the much slower rates at which manual photographic recordings can be made, perhaps 10 to 100 seconds per recording. Fast repetition also allows direct visual observation without flicker.

In order to improve the sensitivity of the device by the use of smoothing, for optimum results it is necessary to match the sweep readout to the phosphor screen decay time and to reduce signal carry over between readout scans. Thus, a conventional P20 phosphor screen with a decay time of about 0.1 to 1 ms as the smoothing element should be scanned within about 0.1 to 1 ms of the occurrence time of the fast pulses to be detected and the readout sweep should not be repeated until about 10 – 100 ms later to avoid possible carry over signal. However, repetitive or redundant readout can be used in this case to improve the effective signal to noise ratio; or single photoelectron detection capability, since it increases the odds of seeing each event. As noted, grid gating can be applied to the preaccelerator mesh of the optical CRT to avoid additional input optical information during this repetitive readout.

The transition between non-photon counting operation at high light levels and slower scan rates merges smoothly into counting operations at lower light levels and faster scans. In effect, some smoothing can be employed under all methods of operation and scan rates, and selectivity of scan rates is only necessary when the ultimate in sensitivity is needed. In addition, instead of circular or spiral scans, the dissector can operate in a line scan mode, wherein a single horizontal line is continuously scanned, or follow a Lissajou pattern. The optical CRT must also operate in the same mode so that the patterns overlap. Raster scanning may also be employed but this would inherently operate at slower rates.

Signal data out of the dissector, whether observed in the counting mode or handled as a signal current, is generated at a high level, above all subsequent amplifier noise, because of the high noise-free gain of the electron multiplication process in the image dissector. Thus an easily manipulated deflection signal is available for the deflection of a monitoring oscilloscope. For some applications it may be necessary or desirable to store digital event information temporarily before deflection in a buffer store, to avoid excessive noise modulation.

The output dissector must track over the path of the fast sweep on the CRT with high resolution. The dissector is in itself an excellent optical tracking device so that it can be used, if necessary, with a pre-scan calibrating sweep on the CRT to automatically determine the position of its desired sweep and with a wobbled rosette type scan during this pre-scan track sweep. Alternatively, the dissector can be digitally swept from a computer output using stored distortion information regarding the distorted CRT sweep.

The present invention thus provides a novel optical detection device which can detect single low-level optical radiation pulses with picosecond resolving power. While only a single embodiment has been illustrated and described, it is apparent that many variations may be made in the particular design and configuration without departing from the scope of the invention as set forth in the appended claims.

What is claimed is:

1. An optical scanning device comprising:
   a remote source of optical radiation pulses;
   a first tubular enclosure having a first transparent faceplate at one end;
   a first electron emissive photosensitive cathode on the inner surface of said first faceplate emitting a first beam of electrons in accordance with the intensity of optical radiation from said source;
   a phosphor screen at the other end emitting light in accordance with the intensity of electron impingement thereon and having a predetermined decay time;
   first means for directing and focusing said first electron beam onto said screen;
   first deflection means between said first photosensitive cathode and screen for rapidly scanning said first electron beam across said screen in a predetermined path;
   a second tubular enclosure having a second transparent faceplate at one end adjacent said phosphor screen to receive light from said screen;
   a second electron emissive photosensitive cathode on the inner surface of said second faceplate emitting a second beam of electrons in accordance with the intensity of light from said screen;
   an apertured scanning electrode at the other end of said second enclosure;
   second means for directing and focusing said second electron beam onto said apertured scanning electrode;
   second deflection means between said second photosensitive cathode and scanning electrode for slowly scanning said second electron beam across the aperture of said scanning electrode at a rate faster than said decay time of said phosphor, said slowly scanning deflection means scanning said second beam in the same relative path as said first rapidly scanning deflection means;
   electron multiplier means disposed to receive and amplify electrons passing through said aperture;
   output means providing output signal from said multiplier having an amplitude varying in accordance with the brightness of said light from said screen; and
   utilization means connected to said output means.

2. The device of claim 1 wherein said first means for directing and focusing said first beam includes an accelerating grid mesh adjacent said first cathode and means applying a high voltage gradient between said grid and said first cathode, said first deflection means including a pair of horizontal and vertical rods disposed about said beam, and pulse means applying a high gradient high frequency resonant voltage to said first deflection means to rapidly scan said first electron beam across said screen in a rotary path, said second deflection means including deflection coils applying a relatively low frequency sweep current to slowly scan said second electron beam over said aperture following the same said rotary path, and said utilization means includes means for displaying said output signal.

3. The device of claim 2 wherein said first means for directing and focusing said first beam includes a further accelerating grid mesh adjacent said phosphor screen.

4. The device of claim 2 including lens means for directing said optical radiation pulses onto said first faceplate.

5. The device of claim 2 wherein said second faceplate includes means for coupling light from said phosphor screen to said second cathode.

6. The device of claim 5 wherein said pulse means applies said high frequency voltage to said accelerating grid mesh in synchronism with said voltage applied to said first deflection means.

7. The device of claim 5 wherein said pulse means applies said high frequency voltage to said horizontal and vertical rods respectively 90° out of phase to provide a circular deflection.

* * * * *